United States Patent [19]

Boothe

[11] Patent Number: 4,730,913
[45] Date of Patent: Mar. 15, 1988

[54] ADJUSTABLE MOUNT FOR LATERAL REAR VIEW MIRROR

[75] Inventor: Craig H. Boothe, Ferndale, Wash.
[73] Assignee: Lee H. Boothe, Alpine, Utah
[21] Appl. No.: 892,280
[22] Filed: Aug. 4, 1986
[51] Int. Cl.$^4$ .................... G02B 5/08; G02B 7/18; B60R 1/08
[52] U.S. Cl. ............................. 350/604; 350/639; 248/480; 248/298
[58] Field of Search .............. 350/639, 632, 604; 248/480, 476, 475.1, 486, 298

[56] References Cited

U.S. PATENT DOCUMENTS

| | | | |
|---|---|---|---|
| 1,050,395 | 1/1913 | Schleicher | 248/298 |
| 2,894,576 | 7/1959 | Williams | 248/480 |
| 4,451,021 | 5/1984 | Merriss | 248/480 |

FOREIGN PATENT DOCUMENTS 1428991  3/1976  United Kingdom ............... 350/639

*Primary Examiner*—Jon W. Henry
*Attorney, Agent, or Firm*—Thorpe, North & Western

[57] ABSTRACT

An adjustable mount for a laterally supported, rear view mirror which is attachable to a flat, upper surface of a side mirror support brace, said mount comprising an elongated base member having a substantially flat (i) top and (ii) bottom surface, (iii) opposing side walls extending downward along opposing side edges of the base member and opposing base member ends. The top surface of the base member has a closed configuration to conceal components and protect interior locking components against adverse elements. The bottom surface of the base member includes a pair of opposing flat shoulders which partially extend from the edges to an elongated slot. This elongated slot traverses the length of the base member and extends within its volumn to form a T-slot track guide which houses an elongated tracking member having a corresponding T shape. A locking bolt is coupled through the mirror support brace and into the tracking member to provide means for locking the base member in a fixed position with respect to the support brace.

4 Claims, 3 Drawing Figures

ADJUSTABLE MOUNT FOR LATERAL REAR VIEW MIRROR

BACKGROUND OF THE INVENTION

1. Field of the Invention

The present invention relates to a mount assembly to be attached to a lateral rear view mirror support bracket such as is typically found on trucks and recreational vehicles. More particularly, the present invention relates to a slidably adjustable mount assembly which permits an attached mirror to be extended or retracted with respect to the mirror support bracket.

2. Prior art

Most trucks include a lateral rear view mirror which is mounted to the door on a support bracket which permits extension of the mirror outwardly from the body of the vehicle. The degree of extension of this bracket and mirror are based upon the length of the truck and need to provide for adequate vision immediately behind the truck body.

If, however, the truck is equipped with a trailer hitch, the degree of extension may be inadequate when trailers, campers, or other large structures are towed behind the truck. Under such circumstances, it would be desirable to have an extension which allows the lateral rear view mirror to be adjusted outward to compensate for the increased length of the truck and attached trailer. Otherwise, a small vehicle may be totally obscured behind the towed structure and may thereby create a major safety hazard.

U.S. Pat. No. 4,451,021 discloses one form of structure intended to provide extension of the mirror to a more remote position. This disclosure includes a slidable base having a slotted opening to provide for a bolted attachment to the lateral mirror support. Although this structure offers a means to extend the mirror to the more remote position, it develops a new problem with respect to security and safety for the extended mirror. Specifically, with the mirror in the extended position, it becomes much more vulnerable to displacement by impact with objects such as bushes, trees, etc. Such contact can easily displace the mirror position from its proper orientation. In addition, the configuration of the 021 patent does not facilitate ease and adjustment of the mirror to a proper viewing prospective. Just as the glancing blows of trees or shrubbery can dislocate the proper mirror orientation, direct adjustment of the mirror can result in dislocation of the mount from its bolted orientation. This may loosen the bolt coupling and lead to subsequent misalignment by virtue of vibrations or other light impact between the mirror and other objects.

OBJECTS AND SUMMARY OF THE INVENTION

Accordingly, it is an object of the present invention to provide an improved mirror extension mount which provides improved stability against inadvertent impact and misalignment.

It is a further object of the present invention to provide an improved extension assembly which simplifies slidable extension of the mirror and locking in place.

In addition, it is a further object of this invention to develop a lateral mirror extension mount which locks in place with the lateral brace mounted to the truck and is not subject to accumulation of ice at the locking mechanism.

These and other objects are realized in an adjustable mount for a laterally supported, rear view mirror which is attachable to a flat, upper surface of a side mirror support brace. This support brace is typically attached to a vehicle at the door or other side mount position. It includes a substantially flat upper surface which forms a track of uniform width for the adjustment mount to slide along to permit lateral adjustment of the mirror with respect to the vehicle. An opening is provided in the support brace for use with a locking screw.

The adjustable mount comprises an elongated base member having substantially flat top and bottom surfaces and opposing side walls which extend downward along opposing edges of the base member. The volume contained between the top and bottom surfaces includes a T-slot which operates as a track guide for a tracking member which is directly coupled to the support brace. The top surface of the base member is closed and flat to conceal components from the weather and to provide an appearance that the base member is merely an extension of the support brace.

The bottom surface of the base member comprises a pair of opposing flat shoulders which extend toward the opposing side walls from the base of the T-slot. The base of the T-slot is an elongated slot which extends between the shoulders and along a central portion of the bottom surface. This T-slot extends substantially the full length of the base member and has a cross sectional configuration resembling a T shape.

The base member also includes means for pivotally attaching a mirror at the top surface thereof in an orientation suitable for providing rear view to an observer seated in the vehicle. Typically, this attaching means is located at a distal end of the base member to provide for maximum extension of the mirror from the vehicle. This extension is provided by displacing the tracking member within the slot such that the base member slides outward with respect to the support bracket. A locking means is coupled to the tracking member and the support brace for locking the tracking member in fixed position at a desired location within the T-slot track guide. The side walls may be extended past the bottom surface of the base member to form a flanged track guide which operates with respect to side walls of the support brace, permitting the base member to slide along the body of this support brace.

Other objects and features of the present invention will be apparent to those skilled in the art from the following detailed description, taken in combination with the drawings.

DETAILED DESCRIPTION OF THE INVENTION

Figure 1:
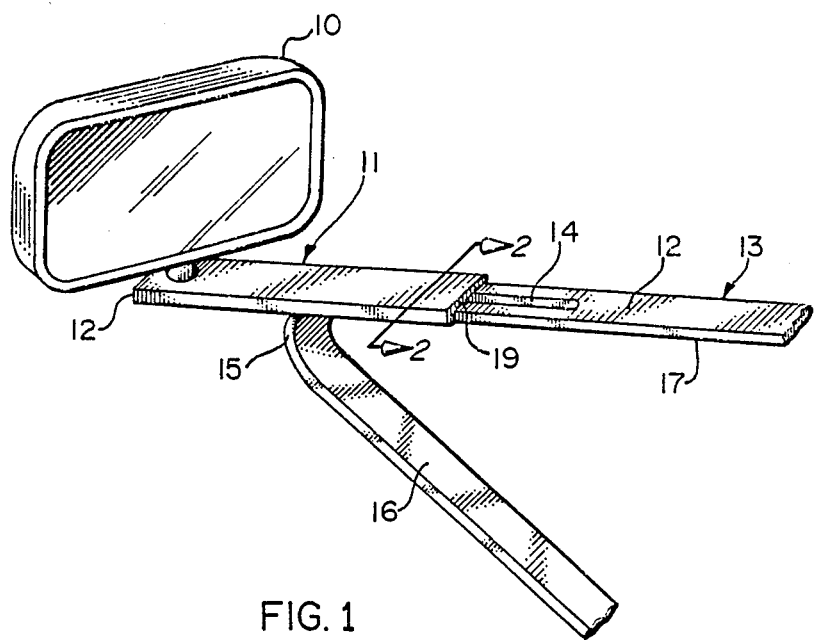
FIG. 1 is a perspective view of the subject adjustment mount with an attached mirror and being mounted to a support brace.

Referring now to the drawings:

FIG. 1 shows a typical rear view mirror mounted to an adjustable mount 11 which comprises the subject invention. This mount 11 is coupled to a flat, upper surface 12 of a side mirror support brace 13. This support brace 13 is the typical configuration used for laterally supporting a rear view mirror on a truck cab or other vehicle which requires extended mirror displacement from the body of the vehicle. Accordingly, the actual attachment of the brace to the vehicle is deemed unnecessary. Such attachment usually occurs at the door or side frame of the vehicle. The upper surface of the support brace forms a track of uniform width upon which the adjustable mount can slide to enable the desired lateral adjustment of the mirror with respect to the vehicle. A slotted opening 14 is included to permit insertion of a locking screw through the brace and into the adjustable mount structure. As is noted from the figure, such braces are typically formed from a bar of steel and are bent to form an elbow 15 with an extending lower leg 16 which is also bracketed to the vehicle as is the case with with upper leg 17 having the upper flat surface 12.

Figure 2:
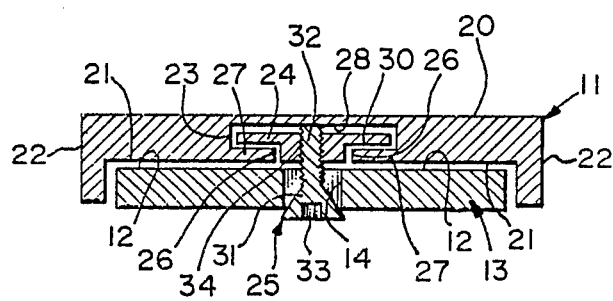
FIG. 2 is a cross section taken along the lines 2—2 of FIG. 1.

The adjustable mount is shown in cross section in FIG. 2. It includes a top surface 20, a bottom surface 21, opposing side walls 22. As shown in FIG. 1, the base member 11 includes opposing ends 18 and 19. These surfaces, walls and ends enclose a volume of space which includes a T-shaped track guide 23 and a T-shaped tracking member 24. This tracking member will be described hereafter in detail and is coupled to the support brace 13 by means of a locking screw 25. This locking screw is inserted through the opening 14 in the brace 13 and extends into the tracking member 24.

The bottom surface 21 of the base member forms a pair of opposing flat shoulders which partially extend from the opposing edges 22 toward each other and terminate at the base 26 of the T-slot. These shoulders 27 form the primary load bearing surface between the adjustable mount 11 and the flat, upper surface 12 of the support brace. By tightening the locking screw 25, the shoulders 27 and flat surface 12 are brought into frictional contact to lock the base member in fixed position with respect to the support brace 13.

Figure 3:
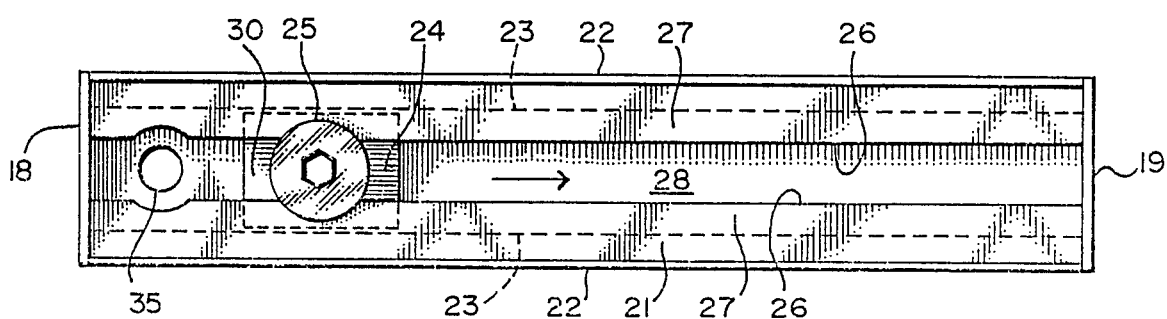
FIG. 3 is a bottom view of the adjustment mount without the attached mirror and being separated from the support brace

As is best shown in FIG. 3, the exposed base 26 of the T-slot extends bewteen the shoulders 27 and along a central portion of the bottom surface. In other words, the elongated T-slot extends substantially the full length of the base member and has a cross sectional configuration resembling a T shape with a single base end 26 and a flat, top section 28. Thus, the T-slot forms a track guide within the contained volume which extends from end 18 to the opposing end 19, the T-slot extending upward into the contained volume and the flat, top section 28 being most proximate to the top surface of the base member 20.

This T-slot tracking guide houses the tracking member 24 and enables it to slide along the length of the base member. The tracking member 24 has a cross sectional shape of T-configuration, substantially corresponding to the T-slot track guide in dimension and size. The vertical height of the tracking member is less than the distance from the top section 28 of the T-slot to the bottom face 21 of the base member. This insures that the bottom surface 30 of the tracking member extends no lower than the bottom surface 21 of the base member. Accordingly, the combined bottom surfaces of the base member 21 and tracking member 24 provide a flat surface which rests against the flat surface 12 of the support brace 13. With these surfaces in a common plain, a more secure locked configuration can be established against the flat surface 12 of the brace.

The means for locking the tracking member 24 and the support brace in fixed position comprises a threaded bolt 25 having a head 31 and shank 32 whose combined length extends below the support brace 13. A hexagonal socket 33 is provided in the head of the bolt to facilitate rotation thereof along a threaded opening 34 and into the T-slot. Rotation of this bolt draws the tracking member into contact with the shoulders 27 of the base member. Further rotation develops locking contact between the bottom face 21 and top face 12 of the support brace. It will be apparent to those skilled in the art that other configurations for locking the tracking member with the brace are feasible. Any such alternative locking mechanism may be used wherein the tracking member is locked in fixed position within a desired location along the length of the T-slot, to thereby lock the position of the adjustment mount with respect to the mirror support brace.

As may be noted in FIG. 1, the top surface of the base member has a closed or covered configuration. This operates to conceal components within the contained volume of the base member. This provides a benefit of both appearance and functionality. Because of the concealed surface, the base member has an appearance of being merely an extension of the flat surface 12 of the support brace 13. This improves the aesthetic appearance of the adjustment mount. Also, the closed configuration protects the locking mechanism from accumulation of ice and dirt which can hinder its operation. Particularly in the winter, ice build up around the locking mechanism may interfere with mirror adjustment.

Similarly, the opposing side walls 22 may extend downward beyond the bottom surface of the base member to form a flanged track guide operable in connection with the support brace. In this instance, the support brace is slidable disposed between the side walls as shown in FIG. 2. This provides greater stability to the mounted assembly, even when the locking means is somewhat loose. This configuration further adds to protection of the contacting faces 21 and 14 from accumulation of dirt or ice. Finally, the ends 18 and 19 of the base member are capped with a cover to conceal open ends of the T-slot track guide. One end of the base member 18 is capped with a cover extending from the top surface 20 and down the extended side walls 22, thereby closing off the flanged track guide, as well as the T-slot track guide. This fully capped end 18 provides an automatic stop as the base member 11 slides inward along the support brace 13. End cap 18 will eventually abut against an upper portion of the brace elbow 15. The remaining end of the base member 19 has its end capped only to the bottom surface of the base member 21 to thereby allow the support brace to slide within this flanged track guide formed by the extended side walls 22.

Included with the structure of the base member is an opening 35 which permits passage of a bolt (not shown) which can be used as means for pivotally attaching the mirror 10 at the top surface 20 of the base member. The pivotal attachment permits adjustment of orientation suitable for providing rear view to an observer seated in the vehicle.

I claim:

1. An adjustable mirror mount for attachment to the side of a vehicle for enabling lateral adjustment of the mirror with respect to the vehicle, said mount comprising:

a side mirror support brace adapted for attachment to a side portion of the vehicle and including a substantially flat upper surface which forms a track of uniform width, said brace including an opening through the track for insertion of a locking screw therethrough;

a slidable mount operable with respect to the track of the mirror support brace, said mount comprising:

an elongated base member having a substantially flat (i) top and (ii) bottom surface, (iii) opposing side walls extending downward along opposing side edges of the base member, (iv) opposing base member ends, and (v) a volume contained within items (i) through (iv) of the base member;

the base member including means for pivotally attaching a mirror at the top surface thereof in an orientation suitable for providing rear view to an observer seated in the vehicle;

the remaining top surface of the base member having a closed configuration to conceal components thereunder and to provide an appearance of the top surface as a mere extension of the flat, upper surface of the mirror support brace;

the bottom surface of the base member comprising a pair of opposing flat shoulders partially extending from the opposing edges toward each other and terminating at an elongated slot which extends between the shoulders and along a central portion of the bottom surface, said shoulders forming the primary loadbearing surface between the adjustable mount and the flat, upper surface of the brace;

the contained volume of the base member including a T-slot extending substantially the full length of the base member, said T-slot having a cross-sectional configuration resembling a T shape having a single base end and a flat, top section;

the base end of the T-slot forming the elongated slot between the shoulders of the bottom surface of the base member, the T-slot extending upward therefrom into the contained volume, the flat, top section of the T-slot being most proximate to the top surface of the base member, the T-slot forming a track guide within the contained volume;

an elongated tracking member having a cross-sectional shape as a T substantially corresponding to the T-slot track guide and being adapted to be slidably disposed therein, the tracking member having a bottom surface which extends no lower than the bottom surface of the base member;

locking means coupled to the tracking member and the support brace for locking the tracking member in fixed position within a desired location along the length of the T-slot to thereby lock the position of the adjustment mount with respect to the mirror support brace; and a rearview mirror coupled to the top surface of the base member.

2. An adjustable mount as defined in claim 1, wherein the opposing side walls extend downward beyond the bottom surface of the base member to form a flanged track guide operable with the support brace wherein the support brace is slidably disposed between the side walls and in contact with the bottom surface of the base member.

3. An adjustable mount as defined in claim 2, wherein one end of the base member is capped with a cover extending from the top surface over the flanged track guide, thereby closing that end of the track guide, the remaining end of the base member having a capped end which extends only to the bottom surface of the base member, thereby providing an opposing open end to the flanged track guide to allow the support brace to slide therein.

4. A mount as defined in claim 1, wherein the tracking member includes a threaded opening which communicates from the bottom surface of the base member to the top section of the T-slot and wherein the locking means comprises a threaded bolt having a shank and head whose combined length extends slightly below the support brace with the adjustable mount attached thereto, said bolt head including means for rotating the shank into the tracking member opening to develop locking contact between the bottom surface of the base member and upper surface of the support brace.

* * * * *